Patented Aug. 26, 1941

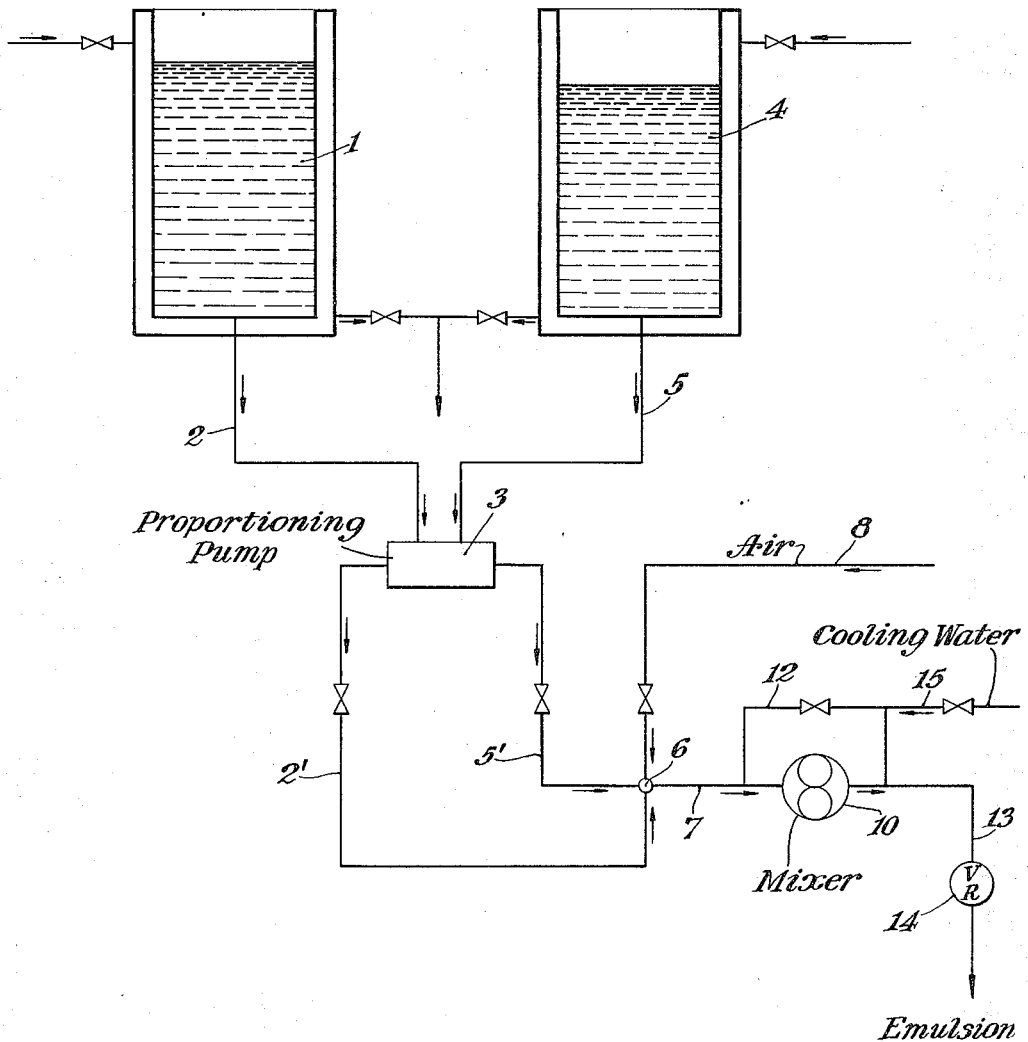

2,254,049

UNITED STATES PATENT OFFICE 2,254,049

METHOD FOR FORMING EMULSIONS

August Henry Schutte, Westfield, N. J.

Application March 18, 1939, Serial No. 262,646

2 Claims. (Cl. 252—314)

This invention relates to a method for producing emulsions generally and more particularly the production of high yields of emulsions from normally immiscible materials.

The principal object of the present invention is to provide a method for forming stable emulsions of oils, fats, soaps, waxes and all other emulsifiable materials for use in the industrial arts.

A still further object is to provide a method, wherein the normally immiscible materials in liquid form are brought together in proper proportions, aerated and thereafter passed through an emulsifier-pump for initial emulsification, after which the emulsion is recirculated through said emulsifier-pump in the presence of a cooling medium before final discharge of the completed emulsion.

The drawing illustrates diagrammatic layout or flow sheet of the apparatus which may be employed in carrying out the objectives of the present invention.

The material to be emulsified, which may normally be a solid, semi-solid or liquid, is placed in a jacketed tank 1 where it is maintained at a suitable temperature to insure its free flow through outlet conduit 2 to proportioning pump 3. The second jacketed tank 4 contains an immiscible non-solvent liquid, such as water, which normally will not form a stable dispersion with the first material. This immiscible liquid is fed to proportioning pump 3 through tank outlet conduit 5.

The proportioning pump 3 permits the desired ratio quantities of the materials to be emulsified to pass therethrough and thence through pipes 2' and 5' to a cross 6 where the separate streams of material are joined before passing into conduit 7. A suitable gas, such as air, is also introduced into the cross 6 from conduit 8, connected to any convenient source of supply, not shown. The mixture or mass of liquefied material, immiscible liquid and air is passed through conduit 7, leading to mixer 10, which is preferably a positive displacement pump of the cycloidal or gear type. However, the mixing device 10 may be an emulsifier, homogenizer, pressure mixing valve or agitator. It is essential, however, that the mixer 10 be provided with a fluid by-pass system 12 for recirculating the initial emulsion produced therein back through the mixer 10 before ultimate discharge through conduit 13 and pressure regulator 14. In some cases the ratio is 9:1.

The by-pass system 12 communicates with a source of cooling water 15 which adds the cooling medium directly into the mass of emulsified material and this initially emulsified material must again circulate through the emulsifier-pump before its discharge from the apparatus. Thus, the latent heat of the emulsion, plus the heat put in by the work of emulsification is removed therefrom in situ and the net cooling of the completed emulsion is thereby accurately controlled to precipitate the desired quantity of materials which were originally liquid.

This method of forming emulsions or stable dispersions is continuous in operation, easily and precisely controlled and due to the recycling and addition of cooling medium to the initial emulsion results in very accurate control of consistency.

The method and apparatus here described is suitable for preparing stable dispersion of oils, fats, waxes, soaps, food stuffs; such as mayonnaise, salad dressing and the like; shaving cream, tooth-paste, confectionary and other products.

What I claim is:

1. A method of finely dispersing a normally solid material in a liquid, which comprises reducing said material to a liquid form, adding a non-solvent liquid thereto, partially emulsifying the mixture, re-emulsifying the major portion of the partially emulsified mixture, and adding additional subcooled quantities of the non-solvent liquid to the partially emulsified portion on its path to re-emulsification to remove the heat of emulsification and to remove the latent heat of the normally solid material whereby it will be finely dispersed in the liquid.

2. A method of finely dispersing a normally solid material, which is relatively insoluble in water, in a water emulsion, which comprises reducing said material to a liquid form, adding water at substantially the same temperature thereto, partially emulsifying the mixture in the presence of air in an emulsifying device, re-emulsifying the major portion of the partial emulsion by recycling the partial emulsion in the emulsifying device, adding further subcooled water to the partially emulsified portion on its path to re-emulsification to remove the heat of emulsification and to precipitate the normally solid material in a finely dispersed form in the water.

AUGUST HENRY SCHUTTE.